March 5, 1963    C. W. ROES    3,079,723
FISHING LURE
Filed Oct. 27, 1961
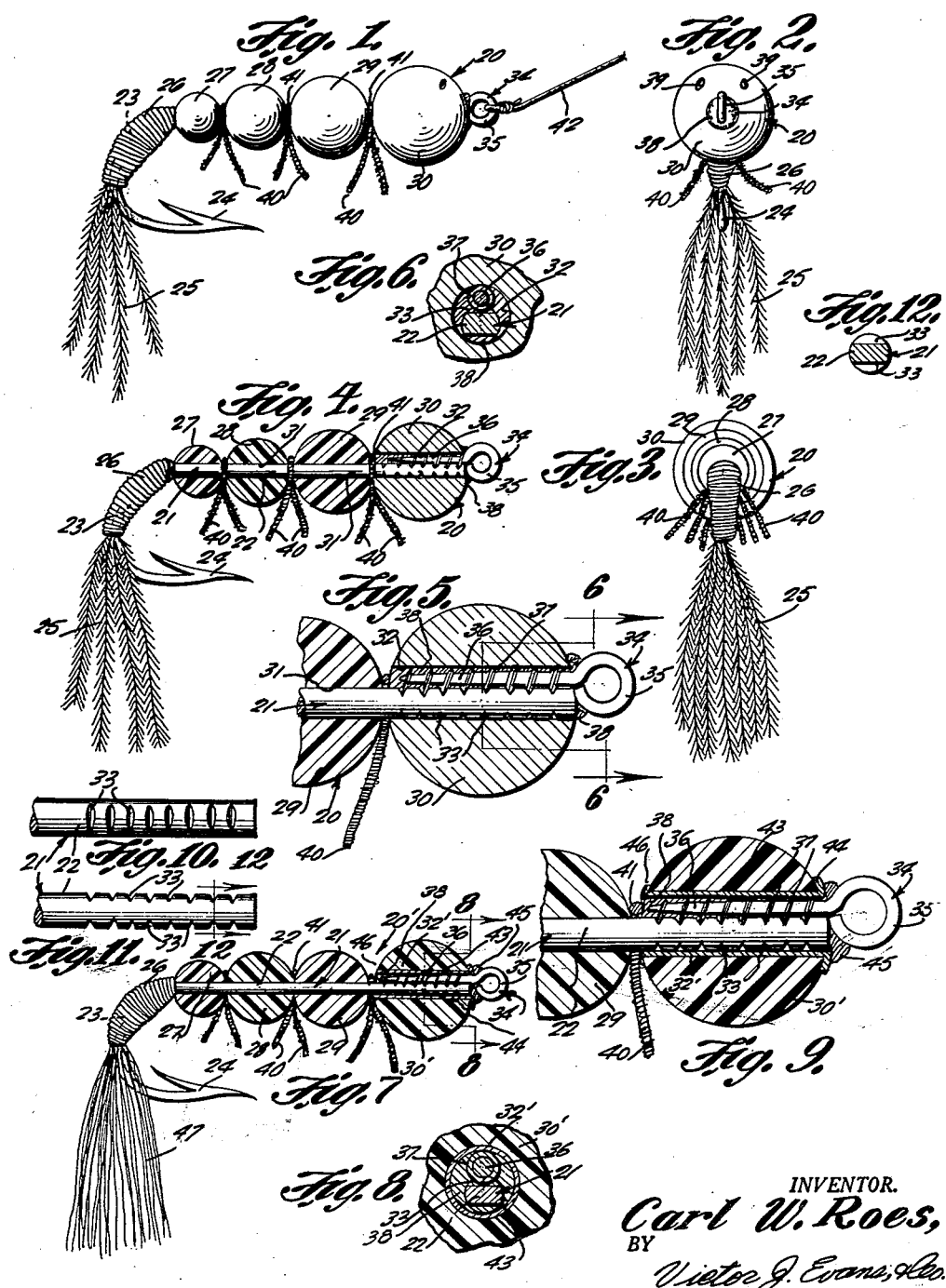
INVENTOR.
Carl W. Roes,
BY Victor J. Evans & Co.
Attorneys

United States Patent Office 3,079,723
Patented Mar. 5, 1963

3,079,723
FISHING LURE
Carl W. Roes, 119 Clarenden Ave., Pikesville, Md.
Filed Oct. 27, 1961, Ser. No. 148,084
1 Claim. (Cl. 43—42.26)

This invention relates to a fishing lure.

The primary object of this invention is to provide a fishing lure which is shaped to resemble bait such as crippled shrimp so that as the lure is moved through a body of water fish will be attracted thereto, and wherein the fishing lure of the present invention is adapted to be used when trolling, casting or the like.

A further object of the invention is to provide a fishing lure of the type stated that includes a plurality of spherical body members that are adapted to be arranged on the shank of a fish hook, and wherein there is provided a novel and efficient means for attaching a fishing line to the lure, and wherein this means also provides an arrangement wherein the parts can be maintained in their proper assembled position or relation with respect to each other.

Still another object is to provide such a fishing lure that is economical to manufacture and efficient in operation and which is rugged in structure and foolproof in use.

These and other objects of the invention will become apparent from a reading of the following specification and claims, together with the accompanying drawings, wherein like parts are referred to and indicated by like reference characters and wherein:

FIGURE 1 is a side elevational view of the fishing lure, constructed according to the present invention.

FIGURE 2 is a front elevational view thereof.

FIGURE 3 is a rear elevational view thereof.

FIGURE 4 is a longitudinal sectional view taken through the fishing lure.

FIGURE 5 is an enlarged sectional view showing the front portion of the fishing lure.

FIGURE 6 is a sectional view taken on the line 6—6 of FIGURE 5.

FIGURE 7 is a longitudinal sectional view similar to FIGURE 4 but illustrating a modification.

FIGURE 8 is a sectional view taken on the line 8—8 of FIGURE 7.

FIGURE 9 is an enlarged sectional view illustrating certain constructional details of the modification of FIGURES 7 and 8.

FIGURE 10 is a fragmentary plan view showing the scored recesses in a portion of the shank.

FIGURE 11 is a view taken at right angles to the view shown in FIGURE 10.

FIGURE 12 is a sectional view taken on the line 12—12 of FIGURE 11.

Referring in detail to the drawings, and more particularly to FIGURES 1 through 6 of the drawings, the numeral 20 indicates the fishing lure of the present invention which is shown to comprise a hook that is indicated generally by the numeral 21, and the hook 21 includes a straight shank 22 as well as a curved portion 23 which terminates in a pointed barb 24. The numeral 25 indicates a tail portion which may consist of feathers that are secured to the curved portion 23 as for example by a suitable wrapping 26, and the tail portion 25 is arranged adjacent the barb 24.

There is further provided a plurality of spherical body members such as the body members 27, 28 and 29 and 30, and as shown in the drawings these body members may be arranged so that they are progressively increased in size from the rear to the front of the fishing lure, and the number of these body members as well as the size thereof can be varied as desired or required. The body members such as the members 27, 28, and 29 are provided with centrally disposed registering apertures or openings 31 through which extends a portion of the shank 22. The front body member 30 defines or provides a head which has an offset aperture or opening 32 therein, and the aperture 32 is larger in size than the adjacent portion of the shank 22, for a purpose to be later described. The head 30 may be made of a suitable material such as rustproof metal, while the members 27, 28 and 29 may be made of a suitable material such as a suitable plastic.

There is further provided a screw member which is indicated generally by the numeral 34, and the screw member 34 has an eye portion 35 on its front end which is arranged contiguous to the outer front portion of the head 30, and the screw member 34 further includes a tapered shank or stem 36 which is arranged in the aperture 32 of the head 30, and the stem 36 has spiral threads 37 thereon which are arranged in engagement with the scored recesses 33 in the shank 22.

The numeral 38 indicates solder which is adapted to be used for fixedly securing the screw member and shank and head together, as for example as shown in FIGURE 5.

As shown in FIGURE 2 the head 30 is adapted to be attractively designed or decorated so that for example the upper front portion of the head 30 may be provided with painted eyes 39 which are adapted to be arranged above and on opposite sides of the portion 35 whereby the fishing lure of the present invention resembles live bait such as a crippled shrimp or the like. The provision of the plurality of body members of progressively increasing size provides a construction wherein the body members simulate the body of a shrimp.

As shown in FIGURES 1 and 4 for example, leg members 40 have intermediate portions 41 which are interposed between adjacent body members. In FIGURE 1 the numeral 42 indicates a portion of a fishing line which is adapted to be connected to the eye 35 when the fishing lure is being used.

Attention is now directed to FIGURES 7, 8 and 9 of the drawings wherein there is illustrated a modified fishing lure that is indicated generally by the numeral 20', and the fishing lure 20' includes a forwardly disposed body member 30' which defines a head, and the head or member 30' may be made of a plastic instead of making the head of metal as is the case of the head 30 of FIGURES 1 through 6. The head 30' is provided with an aperture or opening 32' therein, and the numeral 43 indicates a ferrule or sleeve which extends through the aperture 32', and there is provided on the front end of the ferrule 43 a flange 44 which is positioned contiguous to the front portion of the head 30', and the numerals 45 and 46 indicate points where solder is adapted to be applied for fixedly securing together the screw member 34, shank 22, and sleeve 43. Also, the fishing lure 20' is adapted to have a tail portion 47 made of a suitable material such as hair, instead of using feathers such as the feathers 25. The apertures 32, 32', in the end body members 30, 30', respectively, are offset so that their long axes are spaced from and parallel to the diametric axes of the body members 30, 30'.

From the foregoing, it is seen that according to the present invention there has been provided a fishing lure, and in use with the parts arranged as shown in FIGURES 1 through 6, it will be seen that a fishing line such as the fishing line 42 is adapted to be connected to the eye 35 of the screw member 34 so that when the fishing lure 20 in FIGURES 1 through 6 is arranged in a body of water and when the line 42 is pulled on, the lure 20 will travel through the water in a life-like manner resembling live bait and wherein fish will be attracted thereto, so that the fish can be caught on the barb 24 of the hook 21.

The fishing lure 20 includes the plurality of spherical body members 27, 28, 29 and 30 which are arranged so that they progressively increase in size from rear to front whereby with the leg members 40 having their portions 41 interposed between adjacent body members, and with the other parts arranged as shown in the drawings, the fishing lure will resemble a shrimp. Due to the provision of the larger body member 30 on the front of the fishing lure, and with the other parts arranged as shown, it is to be noted that as the fishing lure is pulled through the water by the line 42, the lure will have a novel movement or action which will increase the attractiveness thereof so that there will be more likelihood of a fish being caught on the hook.

An important aspect or feature of the present invention is the arrangement of the screw member 34 and associated parts, and it is to be noted that the body members 27, 28, and 29 may be made of a suitable plastic like material, while the front body member 30 which provides the head is adapted to be made of a heavier material such as metal, and each of these body members has registering apertures or openings therein for the projection therethrough of the shank 22 of the fish hook. The screw member 34 has its tapered stem 36 arranged in the aperture 32 of the head 30, and the stem 36 has the spiral threads 37 thereon, and these threads 37 are adapted to cam or wedge into the score marks or recesses 33 in the front portion of the shank 22 so that a binding force or action will be provided between the screw member and head and shank in order to help insure that the parts will be maintained in their proper assembled position. Due to the tapered construction or formation of the stem 36, it will be seen that the tighter the member 34 is screwed into the aperture 32, the greater will be the camming action exerted. With the screw member 34 in place as shown in the drawings, it will be seen that the eye 35 will be arranged in a convenient location just forwardly of the body member or head 30 so that the eye 35 provides a convenient attaching means for the fishing line 42. In addition as shown in FIGURE 2 the head 30 is adapted to be attractively painted or decorated so that for example eye portions 39 may be painted or arranged on the upper front portion of the head 30 so that these portions 39 will coact with the eye 35 in order to provide a realistic head that simulates the head of a shrimp or other bait.

With further reference to the modification of FIGURES 7, 8 and 9, it will be seen that the fishing lure 20' is adapted to be used in generally the same manner as the previously described fishing lure 20. However, the lure 20' is adapted to have a head 30' made of plastic instead of metal and the head 30' has an aperture 32' therein which receives a metal ferrule or sleeve 43, and the screw member 34 is adapted to be extended into the sleeve 43 so that the spiral threads 37 cam or wedge into the scored recesses 33 so that after the parts are properly assembled and with the solder applied as at 45 and 46, an integral unit is provided which will not work loose even when the fishing line is connected to the eye 35, and even when the fishing lure is subjected to rough usage during various types of fishing activities.

The fishing lure 20 of FIGURES 1 through 6 is adapted to have solder 38 applied thereto to cause the head 30 and screw member 34 and shank 22 to function as an integral unit.

The tail portion of the fishing lure may consist of feathers as shown in FIGURES 1 through 6 and wherein such feathers are indicated by the numeral 25 and such feathers are adapted to be tied as at 26 to the curved portion 23 of the fish hook 21. Or, material such as hair as indicated by the numeral 47 can be used in lieu of the feathers 25.

Any suitable material can be used for making the various parts, and the various parts or elements can be made of different shapes or sizes as desired or required.

The fishing lure can be arranged or constructed so that the user can fish at different depths and wherein for example by using a relatively heavy head 30 or a lighter plastic head 30', different lure actions can be accomplished. The body members are of solid formation instead of being made hollow. When the plastic head 30' is used, the metal sleeve 43 is positioned in the aperture 32' so that the metal sleeve will provide sufficient rigidity for receiving therein the tapered stem 36, since if such a rigid metal sleeve were not used in the plastic head, the spiral threads 37 might have a tendency to dig into the plastic head in an unwanted fashion.

The tail portion is secured in place on the curved section 23 of the fish hook so that the tail portion will resemble the tail of a real shrimp so that when the fishing lure is being used an action will result which resembles the normal propulsion of a shrimp, and wherein there will be imitated the propelling action of a live shrimp. In addition the present invention has the beads or body members that are strung or mounted on the shank of the fish hook in a novel manner, and the use of the screw member and associated parts provides a rigid securing means as previously stated. When the fishing lure is pulled or moved through the water, an action occurs which is adapted to simulate the action of a crippled shrimp so that in effect a somewhat up and down or rocking motion occurs. The fishing lure of the present invention may be suitably lacquered or colored and can be effectively and efficiently used by professional fishermen as well as by amatuers, and the tail is arranged at an angle of approximately ninety degrees with respect to the longitudinal axis of the shank, and the tail is sufficiently resilient to resemble the action of the tail of a shrimp by which the shrimp propels itself in a backward motion when jerked or jigged in the water. The fishing lure can be used with a spinning or casting rod and reel or the like, and the parts of the lure including the head serve to insure that when the fish lure is used in the water, the tail is adapted to be set in motion to simulate or reproduce the propulsion tail motion of a shrimp.

The head 30 may be made of solid brass or other rust proof material and as a center aperture 32 which is larger than the hook shank, and the screw member has the wedge shaped or tapered stem 36. Black eyes 39 are adapted to be painted on the head 30, and simulated pearl finish may be arranged on the beads or body members behind the head. The wedge shaped or tapered stem 36 of the screw member 34 serves to hold the head and shank of the hook in place until securely anchored together with soldering material such as tin and lead or the like.

Although the present invention herein described is fully capable of achieving the objects and providing the advantages hereinbefore mentioned, it is to be understood that it is merely illustrative of the presently preferred embodiment of the invention, and that it is not to be limited to the details of construction herein described other than as defined in the appended claim.

What is claimed is:

In a fishing lure including a horizontally disposed hook having a straight shank and a curved portion terminating in a barb, a flexible tail disposed adjacent to the curved portion of said hook and secured thereto, a plurality of spherical body members arranged on said shank in side by side relation, a leg member depending from said shank between adpjacent body members, the end one of said body members adjacent the free end of said shank being solid and having an offset aperture therethrough, said aperture having its longitudinal axis spaced from and parallel to the diametric axis of said one body member and being of a diameter greater than the diameter of said shank, a portion of said shank being disposed in said aperture so as to lie along said body member diametric axis, the portion of said shank within said one body member being provided with spaced apart transverse recesses, a screw member having a stem and an eye portion on one end of the stem disposed with the stem parallel to and above said shank portion, said stem having spiral threads thereon received in said recesses, and solder securing said shank portion to said screw member stem.

References Cited in the file of this patent

UNITED STATES PATENTS

| | | |
|---|---|---|
| 2,473,142 | Gilmore | June 14, 1949 |
| 2,551,221 | Pray | May 1, 1951 |